United States Patent [19]
Sekido et al.

[11] Patent Number: 6,033,269
[45] Date of Patent: Mar. 7, 2000

[54] ELECTRICAL ASSEMBLY INCLUDING A CONNECTION BOX HAVING A JUNCTION BLOCK THEREIN

[75] Inventors: Toshihisa Sekido; Hideo Matsuoka, both of Yokkaichi, Japan

[73] Assignee: Sumitomo Wiring Systems, Ltd., Japan

[21] Appl. No.: 09/064,983

[22] Filed: Apr. 23, 1998

[30] Foreign Application Priority Data

Apr. 24, 1997 [JP] Japan ..................................... 9-107846
May 7, 1997 [JP] Japan ..................................... 9-117088

[51] Int. Cl.$^7$ ..................................................... H01R 4/30
[52] U.S. Cl. ........................................... 439/801; 439/796
[58] Field of Search ..................................... 439/801, 535, 439/536, 76.2, 76.1, 796, 797, 775, 527, 929, 949; 174/65 R, 59, 60, 64, 50.52, 61

[56] References Cited

U.S. PATENT DOCUMENTS

| | | | |
|---|---|---|---|
| 1,677,059 | 7/1928 | Tebbs | 439/737 |
| 2,360,304 | 10/1944 | McLoughlin et al. | 439/739 |
| 2,454,962 | 11/1948 | Brown | 174/12 R |
| 4,210,379 | 7/1980 | Vachhani et al. | 439/406 |
| 5,645,457 | 7/1997 | Hirayama et al. | |
| 5,674,090 | 10/1997 | Sumida et al. | 439/540.1 |

FOREIGN PATENT DOCUMENTS 6276648  9/1994  Japan .

*Primary Examiner*—Paula Bradley
*Assistant Examiner*—Ross Gushi
*Attorney, Agent, or Firm*—Jordan. Bierman; Bierman, Muserlian and Lucas

[57] ABSTRACT

An electrical assembly including a connection box and a junction block. The connection box has an electrically conductive plate mounted on one wall which is connected to a source of electricity through an external supply section. The junction block has a plurality of electrical elements on one side and a power transmission section on the other. The latter is electrically conducted to the conductive plate by a transmission harness. Electrical power flows from the source, through the supply section, through the conductive plate, through the transmission harness, and to the electrical elements. The supply section is in the form of a single cable, as is the transmission harness. A generally rectangular attachment section is part of the supply section and receives the head of the fixing bolt and retains it therein. The head of the fixing bolt is inserted into a generally rectangular attachment section and a nut is screwed on the opposite end, thereby clamping the entire supply section together. This provides excellent contact and connection, with a minimum of difficulty in assembly.

11 Claims, 5 Drawing Sheets

ELECTRICAL ASSEMBLY INCLUDING A CONNECTION BOX HAVING A JUNCTION BLOCK THEREIN

This Application claims the benefit of the priorities of Japanese 9-107846, filed Apr. 24, 1997 and 9-117088, filed May 7, 1997.

The present Invention is directed to an electrical assembly composed of a connection box having a junction block located therein. More specifically, the junction box carries a connection to a plurality of electronic elements, such as circuits, fuses, relays, etc. and power is supplied from a source, usually a battery, to the connection box and from the box to the junction block.

BACKGROUND OF THE INVENTION

Electrical connection boxes of the type referred to herein are usually mounted under the hood of a motor vehicle. This permits centralization of the branching connections of the wire harnesses which are connected to the various customary electrical and electronic devices. In addition, the junction block, located within the connection box, provides a single location for fuses, relays, etc.

The connection boxes are formed by injection molding of an appropriate synthetic resin. In one type of installation, known to the prior art, the junction block is wired directly to the power source (e.g. battery). In an alternative device, a busbar is provided in the junction box and connects the various powered circuits to a power receiving terminal. This terminal is connected to the power supply portion of the connection box which, in turn, is connected to the power source. Thus, the busbar provides connections inside the junction block and a wire harness is connected to the power supply. The busbar usually comprises a metal connecting piece stamped from sheet metal and bent as required.

The foregoing configurations have serious drawbacks. The use of a busbar, for example, is advantageous in that it eliminates the need to handle the multiple wire harnesses. However, since complex bending operations are difficult (and hence expensive), the shape of the busbar is restricted and cannot be flexibly installed in the junction box. Moreover, the press required to form such busbars is large and costly. In addition to the foregoing, when stamping the busbar from sheet metal, a substantial amount of unused metal is created, thus increasing material costs.

In the configuration wherein the wire harness directly connects the junction box circuits with the power supply, fewer space related restrictions are imposed. However, due to the multiplicity of wire harnesses which extend from the junction block (and hence from the connection box), it is difficult to physically install in an automobile, especially if the engine compartment is cramped. Moreover, it frequently occurs that the connection box is located at some distance from the power supply; hence, a longer wire harness is required. This contributes to the difficulty in installation.

SUMMARY OF THE INVENTION

It is, therefore, an object of the present Invention to provide a connection box wherein the various connections can be easily made, substantial flexibility of the circuits is provided, and installation is performed efficiently. To accomplish the foregoing, an electrical assembly is provided which includes a connection box and an electrically conductive plate mounted on the side wall thereof. The plate is connected to a source of electricity through an external supply section.

A junction block is located in the connection box and has a power transmission section which is electrically connected to the conductive plate by a power transmission harness. The supply end of the transmission harness is connected to the junction block and to a plurality of electrical elements. In this way, electrical power is conducted from the source, through the supply section and the conductive plate, to the transmission harness and electrical elements. It is a feature of the present Invention that the supply section comprises a single cable extending from the power source to the conductive plate and it is preferable that the transmission harness also comprise a single wire from the conductive plate to the transmission section.

In an advantageous form of the Invention, there is a fixing bolt passing through the conductive plate and the side wall, with the male screw portion thereof extending out of the connection box. A nut is screwed onto the bolt with the first electrical contact located between the nut and the conductive plate. This serves the dual function of securing the conductive plate to the side wall and also maintaining electrical contact between the first electrical contact and the source of power. The first electrical contact is preferably in the form of a ring crimped on the end of the supply harness and fitted over the male screw portion of the fixing bolt.

In a further embodiment of the present Invention, the supply section comprises a generally rectangular attachment section on the side wall. The fixing bolt is provided with an angular (advantageously square) head and the dimensions of the head are such that its width fits snugly within the rectangular attachment section, thereby preventing lateral movement thereof. In a further preferred form of the device, the thickness of the head matches the thickness of the attachment section so that movement longitudinally of the fixing bolt is also prevented.

In a particularly preferred form of the Invention, one of the walls of the attachment section constitutes an abutment surface on which an engagement projection is located. The projection has a retaining surface which bears against the head of the fixing bolt when the latter is inserted therein. Thus, the distance between the abutment surface and the floor of the attachment section is substantially the same as the corresponding size of the head. It has been found particularly useful if the engagement projection includes a slanted receiving surface which eases the movement of the head into the attachment section. It is also preferred that the rectangular attachment section project into the connection box.

Advantageously, a hole is provided in the receiving surface which faces the abutment surface of the attachment section. In particular, if this hole is U-shaped, it is easy to slide the male screw portion of the fixing bolt into the attachment section.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
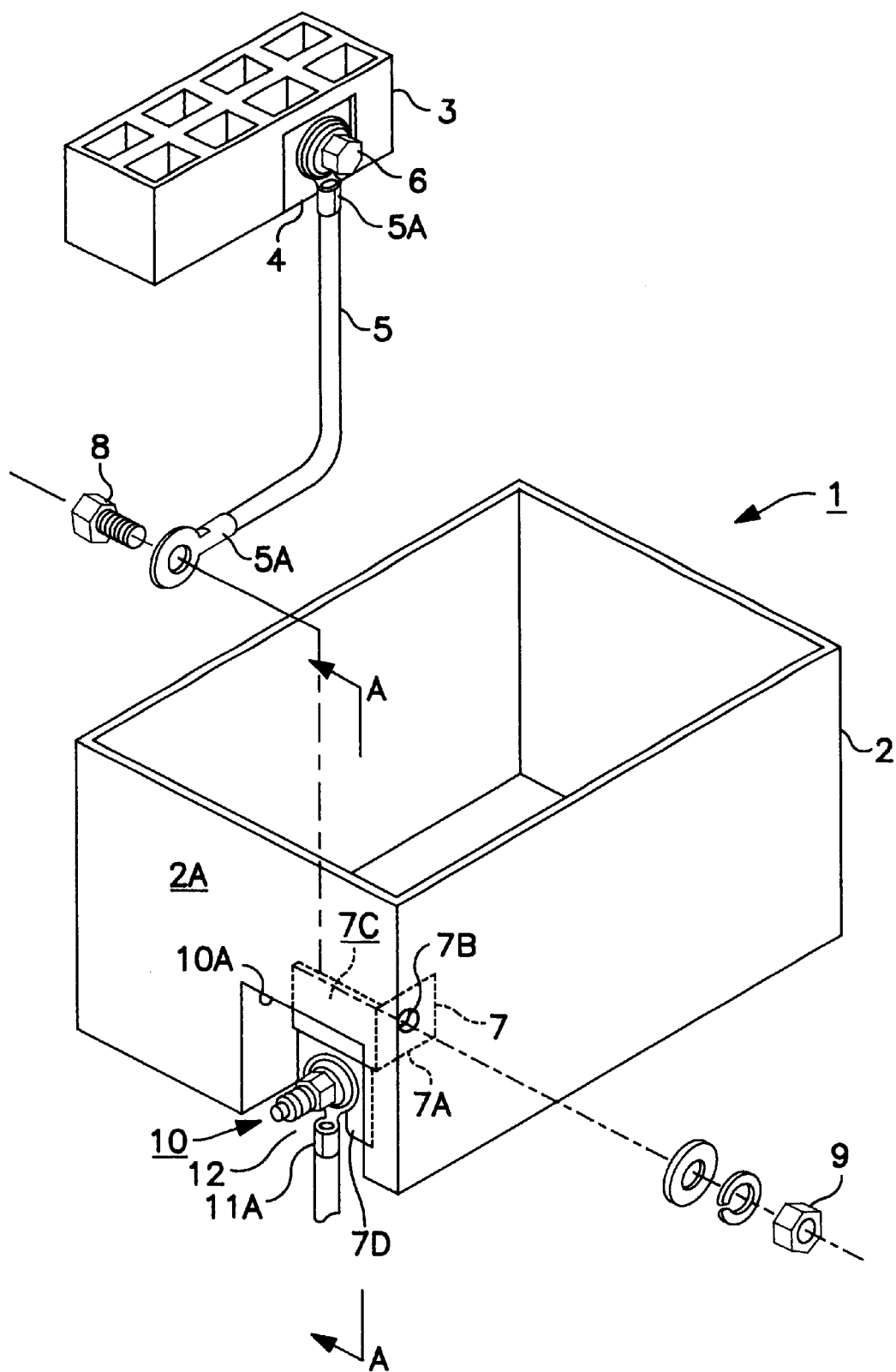
FIG. 1 is an exploded perspective view of the assembly of the present Invention.
Figure 2:
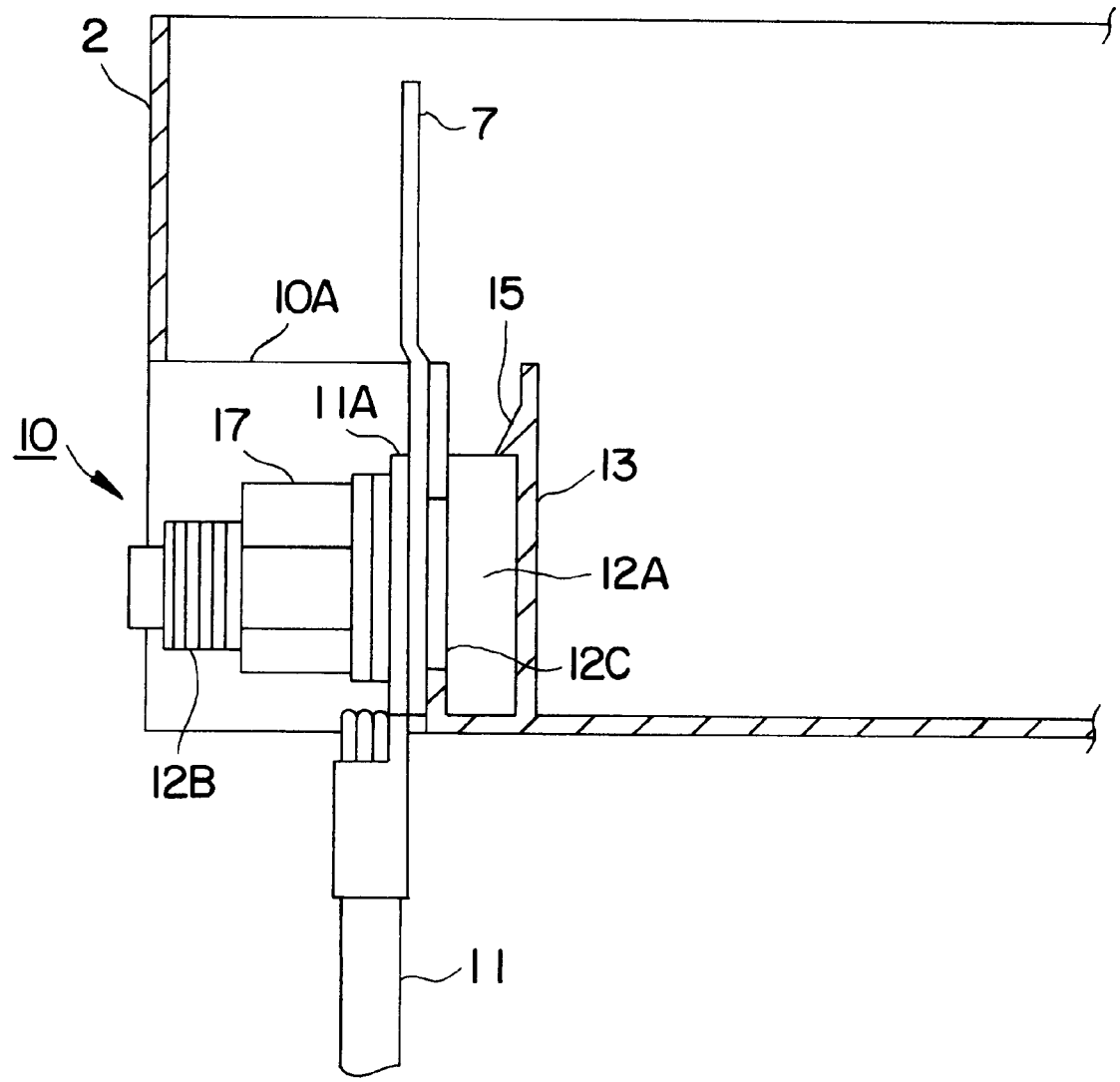
FIG. 2 is a cross section along line A—A of FIG. 1.

The assembly of the present Invention comprises connection box 1, including body 2 and a cover (not shown), and junction block 3. Junction block 3 comprises cavities 18 for connection to various electronic elements and power transmission section 4. Power transmission wire harness 5 carries ring terminals 5A on each end. One end is placed over transmission bolt 6 and secured by a nut. Transmission section 4 is in electrical contact with the various elements in cavities 18. Receiving end 19 of transmission harness 5 is secured to surface 7A of conductive plate 7 by insertion of bolt 8 through ring terminal 5A and hole 7B.

Figure 3A:
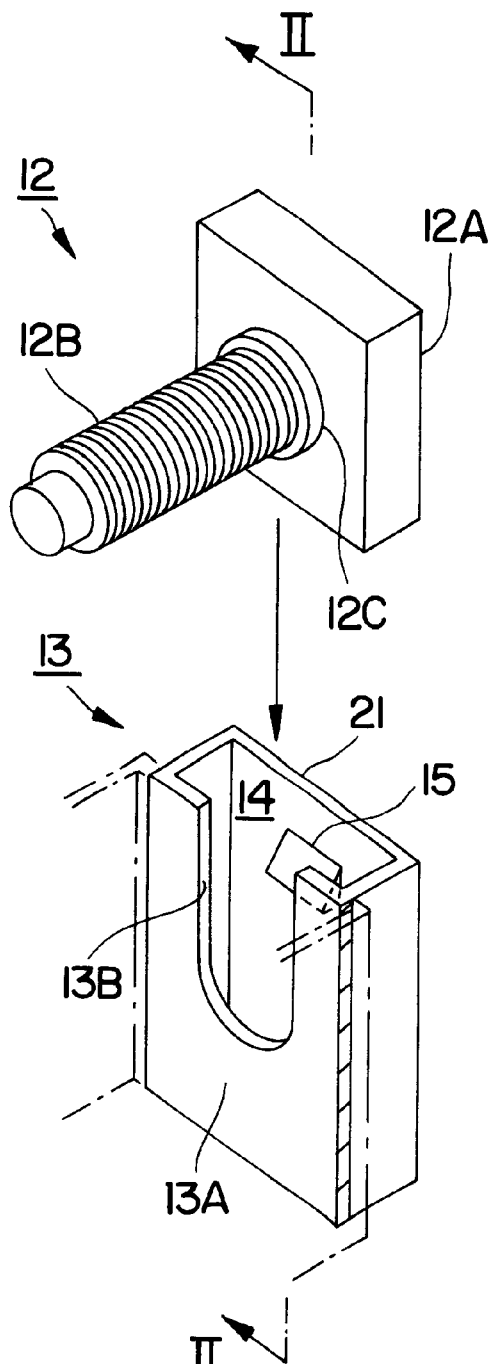
FIG. 3(a) is an exploded perspective view of the fixing bolt and attachment section.
Figure 3B:
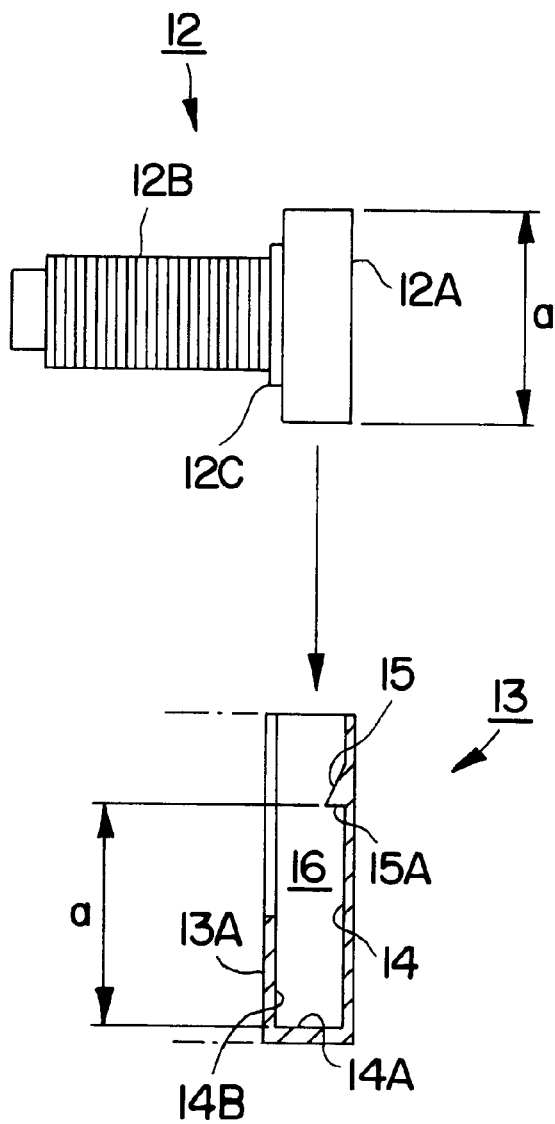
FIG. 3(b) is a cross section along line B—B of FIG. 3(a)

Connection box 1 is provided with external power supply connecting section 10 which comprises attachment section 13 of generally rectangular shape having inner wall 14 and outer wall 13A. U-shaped cut out 13B permits entry of male screw 12B of fixing bolt 12 therein. Head 12A, with support 12C, is inserted into internal space 16 as particularly shown in FIGS. 3(a) and (b). Engagement projection 15 is located on the abutment surface of inner wall 14 and has retaining surface 15A which prevents head 12A from coming out of space 16. Distance a as measured on head 12A is substantially the same as distance a as measured between retaining surface 15A and inner bottom surface 14A.

The thickness of head 12A corresponds to the distance between the inner surface of inner wall 14 and inner surface 14B of outer wall 13A.

Figure 4:
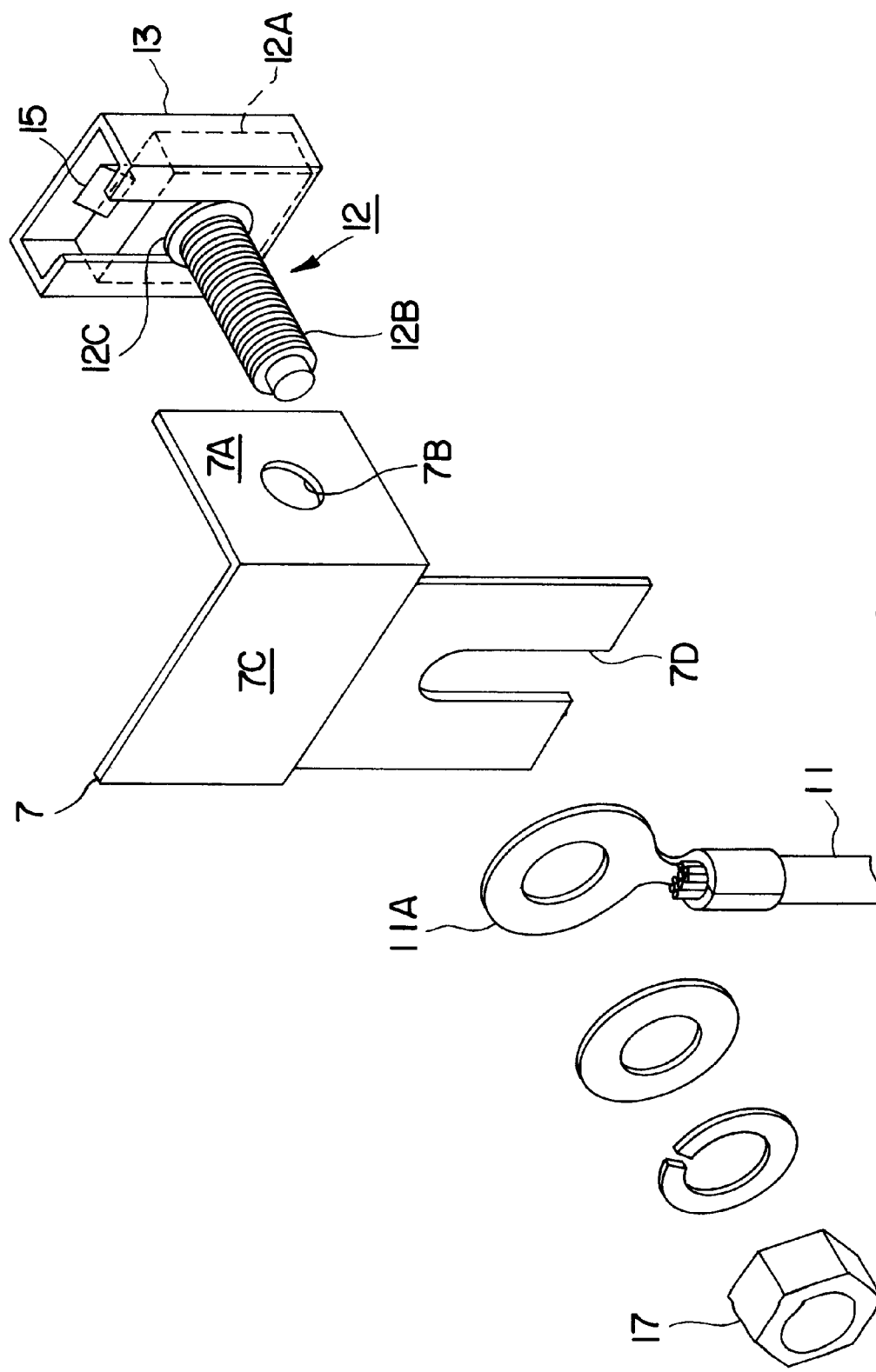
FIG. 4 is an exploded perspective view of the external supply connecting section.
Figure 5:
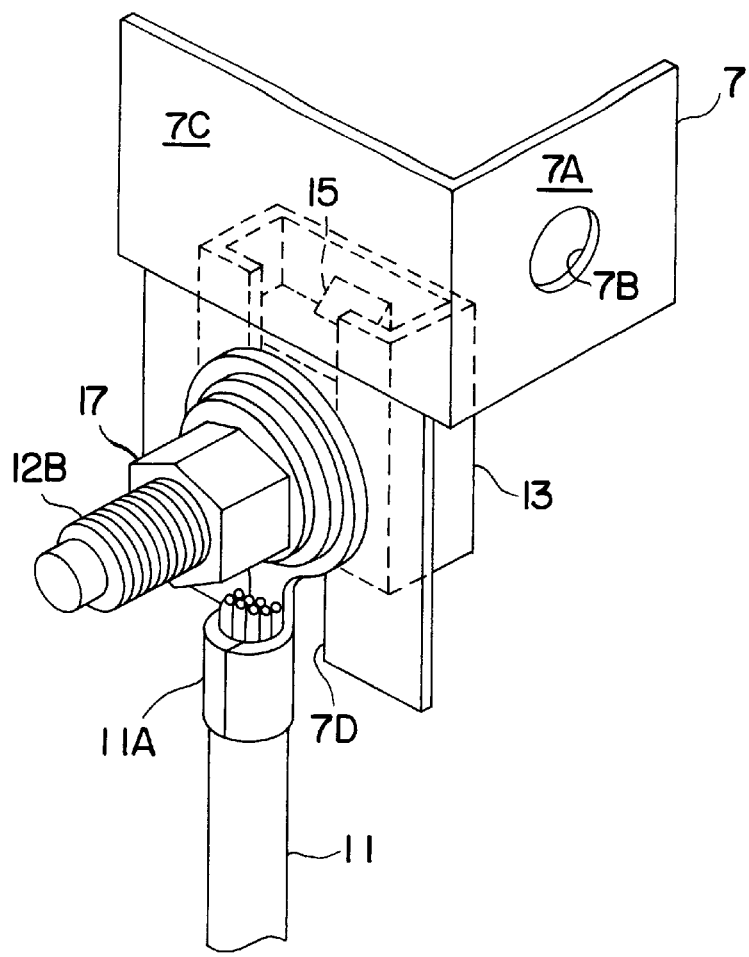
FIG. 5 is a perspective view of the supply connecting section of FIG. 4 in its assembled condition.
Figure 6:
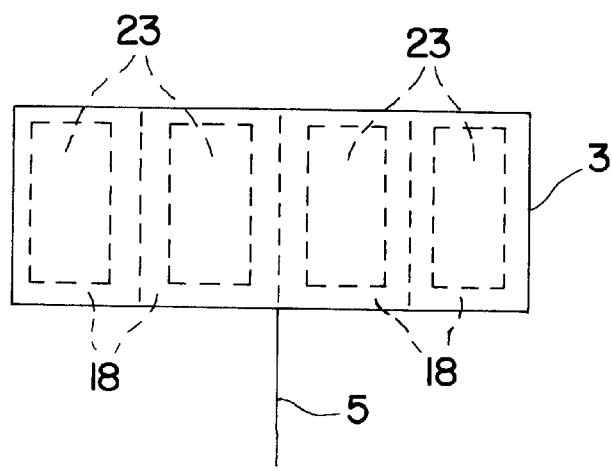
FIG. 6 is a schematic view showing the circuits attached to the junction box.

Referring more particularly to FIGS. 4 and 5, conductive plate 7 comprises surface 7A and surface 7C. Hole 7B is located in surface 7A and U-shaped cut out 7D is in an extension of surface 7C. Head 12A of fixing bolt 12 is inserted into attachment section 13. Engagement projection 15 retains it in place. Male screw 12B projects through U-shaped cut out 7D. Ring terminal 11A is attached to power supply harness 11 and fits over male screw 12B. Nut 17 is placed over male screw 12B and tightened, thereby compressing the optional washers illustrated, ring terminal 11A, and conductive plate 7 against attachment section 13, thereby securing the entire power supply section in place. As is shown schematically in FIG. 6, junction block 3 receives transmission harness 5 which is connected to electronic elements 23 in cavities 18.

As can be seen from the foregoing, the present Invention substitutes conductive plate 7 for the busbar of the prior art. In that construction, the circuit connections could only be implemented by the use of a busbar having a complex shape which would, therefore, be unduly difficult to produce, as well as being expensive. By the use of the present Invention, the various circuits can be easily and freely wired using a simple wire harness, thus reducing material and assembly costs. Moreover, the arrangement of supply connecting section 10 with engagement projection 15 prevents the harness from being pulled out of connection box 1. Thus, it becomes relatively easy to insert the connection box into the engine compartment of the vehicle.

Although only certain embodiments of the present Invention have been expressly disclosed, it is, nonetheless, to be broadly construed and not to be limited except by the character of the claims appended hereto.

What we claim is:

1. An electrical assembly comprising a connection box having a first side wall, a second side wall, perpendicular thereto and meeting said first side wall to form a corner, an electrically conductive plate comprising a first surface mounted on said first side wall and a second surface mounted on said second side wall, said conductive plate extending on either side of said corner, said first surface being connected to a source of electricity by an external supply section;

a junction block adapted for location in said connection box and having a power transmission section electrically connected to said second surface of said conductive plate by a power transmission harness, said transmission harness, at a supply end, electrically contacting a plurality of electrical elements, whereby electrical power is conducted from said source, through said supply section, through said conductive plate, through said transmission harness, and to said electrical elements, said supply section comprising a single wire extending from said source to said conductive plate and said transmission harness comprising:

a single wire from said conductive plate to said transmission section, a first fixing bolt passing through said first surface of said conductive plate and said first side wall, and extending out of said connection box, a first nut on said first bolt, a first electrical contact between said first nut an said conductive plate, whereby said conductive plate is secured to said first side wall in electrical contact with said source of electricity, a second fixing bolt passing through said second surface of said conductive plate and said second side wall of said connection box, said second bolt extending out of said connection box, a second nut on said second bolt, a second electrical contact between said second nut and said conductive plate, whereby said conductive plate is secured to said second side wall in electrical contact with said transmission harness, and a generally rectangular attachment section having a width, parallel to said first side wall, a depth, perpendicular to said first side wall, and a height, perpendicular to said width and said depth, said first fixing bolt having an angular head with a first dimension no larger than said width, whereby said head is introduced into said attachment section and secured therein.

2. The electrical assembly of claim 1 wherein said first electrical contact is a ring contact surrounding said first fixing bolt.

3. The electrical assembly of claim 2 wherein said head is square.

4. The electrical assembly of claim 1 wherein said second electrical contact is a ring contact.

5. The electrical assembly of claim 1 wherein said attachment section has an open top to guide said head into said attachment section.

6. The electrical assembly of claim 1 wherein said head has a second dimension, in a direction parallel to a longitudinal axis of said fixed bolt, said second dimension being complementary to said depth.

7. The electrical assembly of claim 1 comprising an engagement projection, having a retaining surface, on an abutment surface of said attachment section, a distance between said abutment surface and a floor of said attachment section being complementary to a third dimension of said head which is perpendicular to said first dimension and said second dimension.

8. The electrical assembly of claim 7 wherein said engagement projection includes a slanted surface, upstream of said abutment surface in an opposite direction to an insertion direction of said head into said attachment section.

9. The electrical assembly of claim 1 wherein said rectangular attachment section projects inwardly of said connection box.

10. The electrical assembly of claim 1 wherein said supply section comprises a generally rectangular attachment section having a width, parallel to said side wall, a depth, perpendicular to said side wall, and a height, perpendicular to said width and said depth, said attachment section having an abutment surface and a receiving surface facing said abutment surface, said receiving surface including a hole adapted to receive said first fixing bolt.

11. The electrical assembly of claim 1 wherein said attachment section has an outer wall with a U-shaped cut out therein.

* * * * *